(12) United States Patent
Teo et al.

(10) Patent No.: US 9,564,810 B2
(45) Date of Patent: Feb. 7, 2017

(54) SWITCHED MODE POWER SUPPLY

(71) Applicant: Infineon Technologies Austria AG, Villach (AT)

(72) Inventors: Yong Siang Teo, Singapore (SG); Xiao Wu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 580 days.

(21) Appl. No.: 13/852,866

(22) Filed: Mar. 28, 2013

(65) Prior Publication Data

US 2014/0293660 A1 Oct. 2, 2014

(51) Int. Cl.
  *H02M 3/335* (2006.01)

(52) U.S. Cl.
  CPC .................. *H02M 3/33507* (2013.01)

(58) Field of Classification Search
  CPC .............. H02M 3/335; H02M 3/33507; H02M 3/33523; H02M 3/33561; H02M 3/33569; H02M 3/33592
  USPC ......... 363/21.01, 21.04–21.12, 21.15–21.16, 363/21.18, 53, 76, 77, 125–127, 131–134
  See application file for complete search history.

(56) References Cited

U.S. PATENT DOCUMENTS

| 5,087,870 | A | 2/1992 | Salesky et al. | |
|---|---|---|---|---|
| 7,061,225 | B2* | 6/2006 | Yang | H02M 3/33507 324/103 P |
| 7,061,780 | B2* | 6/2006 | Yang | H02M 3/33523 363/21.13 |
| 8,711,583 | B2* | 4/2014 | Yang | H02M 1/4258 363/21.13 |
| 8,804,382 | B2* | 8/2014 | Stone | H02M 1/36 363/127 |
| 8,879,289 | B2* | 11/2014 | Lin et al. | 363/97 |

(Continued)

FOREIGN PATENT DOCUMENTS

| CN | 1862935 A | 11/2006 |
|---|---|---|
| CN | 101127495 A | 2/2008 |

(Continued)

OTHER PUBLICATIONS

"Off-LIne SMPS Current Mode Controller with Integrated 800V CoolMOS® and Startup Cell (Brownout & Frequency Jitter) in DIP-7," ICE3AR2280JZ, Infineon Technologies AG, CoolSET®-F3R80, Datasheet Version 2.1a, Jan. 11, 2012, 34 pages.

(Continued)

*Primary Examiner* — Gary L Laxton
*Assistant Examiner* — Kevin H Sprenger
(74) *Attorney, Agent, or Firm* — Slater Matsil, LLP

(57) ABSTRACT

A switching power converter includes an inductor coupled to a terminal operably supplied with an input voltage. A semiconductor switch is coupled to the inductor and configured to enable and disable an input current passing through the inductor in accordance with a drive signal. A current sense circuit is coupled to the inductor or the semiconductor switch and is configured to generate a current sense signal representing the input current passing through the inductor or the semiconductor switch. A control circuit receives the current sense signal and is configured to: close the semiconductor switch regularly in accordance with a clock frequency, to integrate the current sense signal thus providing an integrated current sense signal to compare the integrated current sense signal with a threshold that is a function of the input voltage.

25 Claims, 4 Drawing Sheets

(56) References Cited

U.S. PATENT DOCUMENTS

| | | |
|---|---|---|
| 2008/0043504 A1* | 2/2008 | Ye et al. .................. 363/97 |
| 2010/0002474 A1* | 1/2010 | Moon et al. ............ 363/21.18 |
| 2010/0033136 A1 | 2/2010 | Yang |
| 2010/0208502 A1 | 8/2010 | Horii |
| 2010/0302811 A1 | 12/2010 | Saint-Pierre |
| 2010/0315841 A1* | 12/2010 | Saji ..................... 363/21.12 |
| 2011/0292704 A1 | 12/2011 | Makino et al. |
| 2013/0242620 A1* | 9/2013 | Hosotani ............... 363/21.09 |

FOREIGN PATENT DOCUMENTS

| | | |
|---|---|---|
| CN | 101795073 A | 8/2010 |
| CN | 102263492 A | 11/2011 |
| CN | 102497711 A | 6/2012 |
| CN | 102916586 A | 2/2013 |

OTHER PUBLICATIONS

"Off-Line SMPS Current Mode Controller with Integrated 650V CoolMOS® and Startup Cell (Latched and frequency jitter Mode)," ICE3A1065ELJ, Infineon Technologies AG, CoolSET®-F3, Datasheet Version 2.2, Jun. 30, 2011, 29 pages.

* cited by examiner

DCM operation

CCM operation

SWITCHED MODE POWER SUPPLY

TECHNICAL FIELD

The present disclosure relates to a switched mode power supply (SMPS) also referred to as switching power converters. Particular embodiments describe an over-current or over-power protection for the switching power converter is described.

BACKGROUND

Switched mode power supplies (SMPS) are becoming increasingly common as power supplies for a great variety of applications. For example, SMPS may be used as power supplies for driving LEDs, which may be used to replace incandescent lamps for illumination purposes. However, many other applications for switching power converters exist as practically any electric and electronic device which requires a DC power supply voltage (or current) can be connected to the power grid using SMPS.

Switching power converter may be operated in various modes. For example, switching converters may be operated, inter alia, with a fixed switching frequency and a variable on-time of the switch and with a fixed on-time of the switch and variable frequency. Regardless of whether a switching power converter operates with a fixed or a variable frequency, switching power converters may operate in continuous current mode (CCM) or discontinuous current mode (DCM). As different modes of operation (DCM with fixed on-time, DCM with fixed frequency, CCM with fixed frequency, etc.) usually require different concepts of controlling (regulating) the output voltage or the output current, some switching power converters are designed to operate only in a single mode (e.g., CCM, fixed frequency). However, switching power converters are often required to be able to provide a specific constant DC output voltage (or current) for a great range of AC input voltages (e.g., from 85 to 270 volts). In this case, the switching power converter is usually designed to handle both modes of operation, DCM and CCM, and a mode-switch from CCM to DCM occurs when the AC input voltage exceeds a defined threshold voltage, which is pre-set by circuit design.

To accomplish the control task mentioned above the input current (which is switched on and off by a power semiconductor switch) of the power switching converter is usually measured, e.g., using a measurement resistor that provides a voltage drop proportional to the current passing through it. The measured input current is usually compared to a reference value and a switch-off of the power semiconductor switch is triggered when the input current exceeds a threshold defined by this reference value. However, the power semiconductor does not switch-off the input current (sometimes also referred to as primary current) immediately with zero delay. Not only the power semiconductor switch exhibits an inherent switch-off delay. Furthermore, the comparator circuit (which compares the measured input current with the mentioned threshold) and other circuit components included in the control circuit (which controls the switching operation of the power converter) cause additional delays. As a result an over-shot of the input current (primary current) occurs, which may lead to excessive power dissipation in the semiconductor switch.

To avoid the mentioned excessive power dissipation, the effect of the mentioned delays should be eliminated (or at least partly compensated for). However, in known solutions this delay time compensation is either designed for DCM or for DCM. Thus, it would be useful to improve the control circuit of a SMPS such that excessive power dissipation is avoided independent form the mode of operation (DCM, CCM) of the switching power converter.

SUMMARY OF THE INVENTION

A switching power converter is disclosed. In accordance with one aspect of the invention, the switching power converter includes an inductor coupled to a terminal operably supplied with an input voltage and a semiconductor switch coupled to the inductor and configured to enable and disable an input current passing through the inductor in accordance with a drive signal. The switching power converter further includes a current sense circuit, which is coupled to the inductor or the semiconductor switch and configured to generate a current sense signal that represents the input current passing through the inductor or the semiconductor switch. A control circuit receives the current sense signal and is configured to close the semiconductor switch regularly in accordance with a clock frequency, to integrate the current sense signal thus providing an integrated current sense signal, to compare the integrated current sense signal with a threshold, and to open the semiconductor switch dependent on the result of the comparison. The threshold is a function of the input voltage.

In accordance with another aspect of the invention, the switching power converter includes an inductor coupled to a terminal operably supplied with an input voltage and a semiconductor switch coupled to the inductor and configured to enable and disable an input current passing through the inductor in accordance with a drive signal. A current sense circuit is coupled to the inductor or the semiconductor switch and configured to generate a current sense signal, which represents the input current passing through the inductor or the semiconductor switch. A control circuit receives the current sense signal as well as a signal representing the input voltage. Moreover, the control circuit includes a threshold generator that receives the signal representing the input voltage. The threshold generator is configured to generate a threshold, which is a function of the input voltage. The control circuit further includes an integrator that receives the current sense signal. The integrator is configured to generate a signal representing the integrated input current. Furthermore, the control circuit includes a comparator that receives the threshold and the signal representing the integrated input current. The comparator is configured to indicate when he the signal representing the integrated input current reaches the threshold. A driver circuit is configured to switch on the semiconductor switch periodically in accordance with a clock signal and to switch it off when the comparator indicates that the signal representing the integrated input current has reaches the threshold.

In addition to the above a method for operating a power converter is disclosed, wherein power converter may comprise an inductor coupled to a terminal operably supplied with an input voltage. In accordance with another aspect of the invention the method comprises enabling and disabling an input current, which passes through the inductor in accordance with a drive signal thereby using a semiconductor switch, which is coupled to the inductor. A current sense signal representing the input current passing through the inductor or the semiconductor switch is generated. The method further comprises closing the semiconductor switch regularly in accordance with a clock frequency, integrating the current sense signal thus providing an integrated current sense signal, and comparing the integrated current sense signal with a threshold, which is a function of the input voltage. The semiconductor switch is opened dependent on the result of the comparison.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the figures.

DETAILED DESCRIPTION OF ILLUSTRATIVE EMBODIMENTS

The exemplary embodiments of the present invention include a flyback converter which is a commonly used converter topology in applications in which a galvanic isolation is needed. However, the principles discussed below with regard to a flyback converter may also be applied to other converter topologies such as, e.g., floating buck converters or the like. Excessive power dissipation may be avoided by integrating the input (primary) current sense signal and comparing this integrated signal with a threshold signal. This threshold signal may depend on the input voltage applied to the switching power converter.

Figure 1:
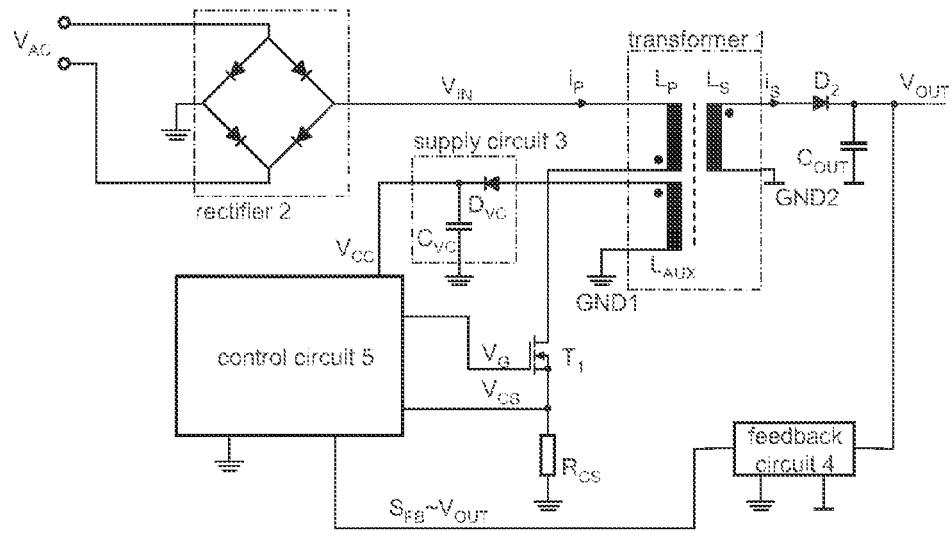
FIG. 1 is a circuit diagram illustrating the basic components of a flyback converter.

FIG. 1 illustrates a switching power converter circuit that includes a transformer 1 having a primary winding $L_P$ and a secondary winding $L_S$. An auxiliary winding $L_{AUX}$ may be used for providing a supply voltage for the control circuitry that controls the operation of the power semiconductor switch $T_1$ which is coupled in series to the primary winding $L_P$ such that the input current (further referred to as primary current $i_P$) passing through the primary winding $L_P$ can be switched on and off by the semiconductor switch $T_1$ in accordance with a drive signal $V_G$ (e.g., a gate voltage signal or a gate current signal in case of a MOSFET or an IGBT). The input voltage $V_{IN}$ is applied to the primary winding $L_P$ during the time interval the semiconductor switch $T_1$ is switched on (i.e., during the on-time). The input voltage $V_{IN}$ essentially drops across the power semiconductor switch $T_1$ during the time interval the semiconductor switch $T_1$ is switched off (i.e., during the off-time). For measuring the primary current $i_P$ a current sense circuit may be coupled to the power semiconductor switch $T_1$. In the present example of FIG. 1 a current sense resistor $R_{CS}$ is connected between the power semiconductor switch $T_1$ and ground terminal GND1 such that the primary current passing through the transistor $T_1$ also passes through the current sense resistor $R_{CS}$. The voltage drop $V_{CS}$ across the resistor $R_{CS}$ is proportional to the primary current $i_P$. It should be noted, however, other current measurement techniques should be used instead of the current sense resistor $R_{CS}$. Current measurement could also be accomplished using, for example, a sense transistor coupled to the load transistor.

The input voltage $V_{IN}$ may have a waveform corresponding to a (full-wave) rectified sine signal. This is the case when a rectifier is used to couple the switching power converter to the AC power grid. In the present example, a bridge rectifier circuit 2 is used to convert the AC line voltage $V_{AC}$ to the input voltage $V_{IN}$. In the present example, it is desired that the switching power converter can handle AC line voltages of 85 to 270 volts rms (rms=root means square) while maintaining the output voltage (or output current) at a specific level. This interval from 85 to 270 volts is, however, just an example, and the actual input voltage range may depend on the actual application. Nevertheless, in order to be able to work properly with the power grids in various countries all over the world the input voltage range is usually comparably broad.

The secondary winding $L_S$ of the transformer 1 is coupled to the output of the switching power converter. A rectifier diode $D_2$ is coupled between a first end of the secondary winding $L_S$ and an output terminal, at which the output voltage $V_{OUT}$ is provided. The second end of the secondary winding is coupled to ground terminal GND2. The output voltage $V_{OUT}$ may be buffered using an output capacitor $C_{OUT}$, which is coupled between the output terminal and the corresponding ground terminal GND2. It should be noted that the circuit components coupled to the primary side of the transformer 1 are supplied with respect to the "primary side ground" GND1 wherein the circuit components coupled to the secondary side of the transformer 1 are supplied with respect to the "secondary side ground" GND2. The ground terminals GND1, GND2 of both sides are isolated from each other to ensure full galvanic separation between the primary side and the secondary side. However, the ground terminals GND1, GND2 of both sides may be coupled via a capacitor (not shown in the Figure).

In order to regulate the output voltage $V_{OUT}$ or the output current (further referred to as secondary current $i_S$) the output terminal may be coupled to a feedback circuit 4 which is configured to generate a feedback signal $S_{FB}$ (e.g., a feedback voltage) from the output voltage $V_{OUT}$ or the secondary current $I_S$. Further, the feedback circuit 4 provides a galvanic isolation between its input and its output which may be accomplished, for example, using an opto-coupler. Circuits providing a feedback signal, which represents the output voltage or secondary current and including an opto-coupler for galvanic isolation are per se known in the field and, therefore, not discussed in detail herein.

The feedback signal $S_{FB}$ as well as the current sense signal $V_{CS}$ are supplied to a control circuit 5 which is configured to generate, dependent therefrom the drive signal $V_G$ for the semiconductor switch. Thereby, the control circuit 5 incorporates a control law to regulate the output voltage $V_{OUT}$ or the secondary current $i_S$ to match a specific (pre-set or adjustable) desired value. The control circuit 4 may have its own power supply. In the present example, the control circuit 5 is supplied by the capacitor $C_{VC}$ which is charged via the rectifier diode $D_{VC}$ by the auxiliary winding. However, a different power supply for the control circuit may be applicable. The function of the control circuit 4 is discussed below in more detail with reference to the timing diagrams shown in FIGS. 2A-B.

Figure 2A:
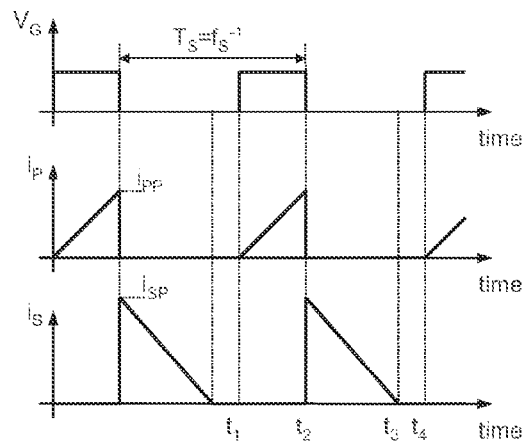
FIG. 2, which includes FIGS. 2A through 2B, provides timing diagrams illustrating the waveforms of the input (primary) current, the output (secondary) current, and the corresponding gate signal of the power semiconductor switch in DCM (2A) and CCM (2B)
Figure 2B:
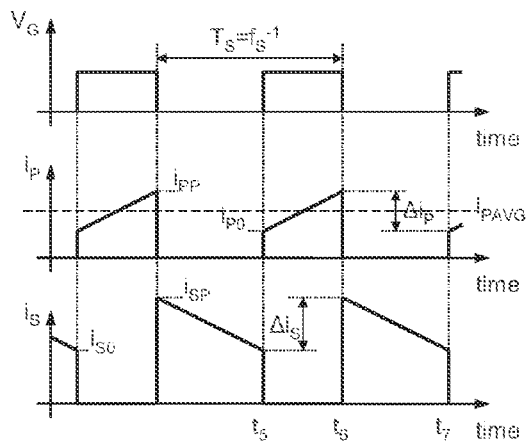

Two different cases are illustrated in the timing diagrams of FIGS. 2A-B. The diagrams in FIG. 2A refer to switching operation in the discontinuous current mode (DCM) whereas the diagrams in FIG. 2B refer to switching operation in the continuous current mode (CCM). The mode of operation may depend on the level of the input voltage $V_{IN}$. In both modes of operation (DCM and CCM) the time instants $t_1$ and $t_5$, at which the semiconductor switch is switched on, and the time instants $t_2$ and $t_6$, at which the semiconductor switch is switched off, may be time-triggered or event-triggered. In a switching power converter that operates with a fixed frequency and variable on-time (i.e., a variable duty-cycle) these time instants are time-triggered. In a switching power converter that performs a quasi-resonant oscillation, the switch-on time as well as the switch-off time may be event-triggered. The "event," which triggers a switch-off of the semiconductor switch, may be, for example, the primary current $i_P$ reaching a threshold value $V_{REF}/R_{CS}$, whereas the event, which triggers a switch-on of the semiconductor switch, may be the voltage across the semiconductor switch being at a (local) minimum. For further discussion, a flyback converter operated at a fixed frequency $f_S$ ($f_S = T_S^{-1}$) and having a variable duty cycle D ($D=T_{ON}/T_S$) is considered as an illustrative example.

The following considerations assume stationary operation in DCM as illustrated in the diagrams in FIG. 2A. A switching cycle starts at time instant $t_1$ and ends at time instant $t_4$ when the subsequent switching cycle begins. That is, the period $T_S$ of one cycle can be calculated as:

$$T_S = (t_4 - t_1) = f_S^{-1}.$$

The drive signal (e.g., the gate voltage $V_G$), which controls the switching state of the semiconductor switch $T_1$, is switched on at time instant $t_1$ and switched off at time instant $t_2$. That is, the on-time $T_{ON}$ can be calculated as $$T_{ON} = (t_2 - t_1) = D \cdot T_S = D \cdot (t_4 - t_1),$$

wherein D denotes the duty cycle (D∈[0, 1]). The remaining time of one cycle is the off-time $T_{OFF}$, which can be calculated as $$T_{OFF} = (t_4 - t_2) = (1 - D) \cdot T_S.$$

During the on-time $T_{ON}$ the primary current $i_P$ rises from zero to its peak value $i_{PP}$. The gradient of the current ramp is $V_{IN}/L_P$ ($L_P$ representing the inductance of the primary winding) which is almost constant if the input voltage $V_{IN}$ does not significantly change during one cycle. At time instant $t_2$ the energy $E_{DCM}$ stored in the inductor can be calculated as $$E_{DCM}(t_2) = L_P \cdot i_{PP}^2 / 2.$$

As the semiconductor switch $T_1$ is switched off at time instant $t_2$ the energy $E_{DCM}$ is "transferred" from the primary side to the secondary side of the transformer 1 (see FIG. 1) due to inductive coupling. The secondary current $i_S$ is zero during the on-time $T_{ON}$ (as the rectifier diode $D_2$ is reversed biased) and falls from its initial peak value $i_{SP}$, which occurs at time instant $t_2$, down to zero, which is reached at time instant $t_3$. The secondary current $i_S$ remains zero between time instants $t_3$ and $t_4$. It should be noted that delay times (rise and fall times) are neglected in the present discussion in order to allow concentration on basic function of the circuit. The secondary peak current $i_{SP}$ fulfills the equation $E_{DCM}(t_2) = L_S \cdot i_{SP}^2 / 2 = L_P \cdot i_{PP}^2 / 2$, wherein $L_S$ represents the inductance of the secondary winding. The gradient of the secondary current ramp during the off-time $T_{OFF}$ is $(V_{OUT} + V_{D2})/L_S$ wherein the $V_{D2}$ is the forward voltage of the rectifier diode $D_2$. In contrast to CCM, the DCM is characterized in that the secondary current $i_S$ drops (beginning at $i_{SP}$) to zero during a switching cycle whereas this is not the case during CCM. In the present example, the time $t_2$.

Continuous current mode (CCM) is illustrated in the diagrams in FIG. 2B. A switching cycle starts at time instant $t_5$ and ends at time instant $t_7$ when the subsequent switching cycle begins. In stationary operation, the initial primary current $i_{P0}$ ($i_{P0} = i_P(t_5)$), which would be zero in DCM, is greater than zero in CCM as the energy $E_{CCM}$ "stored" in the transformer windings $L_P$ and $L_S$, respectively, never falls to zero during the off time $T_{OFF}$. At time instant $t_5$ the semiconductor switch $T_1$ is closed (drive signal $V_G$ is at a high level) and the primary current $i_P$ starts to ramp up from the initial value $i_{P0}$ to the peak level $i_{PP}$, wherein $i_{PP} = i_{P0} + \Delta i_P$. When the primary current reaches its peak value $i_{PP}$ (defined by a threshold $V_{REF}/R_{CS}$) at time instant $t_6$ the semiconductor switch $T_1$ is switched off and the secondary current ramps down from its peak value $i_{SP}$ to its final value $i_{S0}$, wherein $i_{SP} = i_{S0} + \Delta i_S$. The energy "stored" in the transformer varies from $E_{CCMmin} = L_S \cdot i_{S0}^2 / 2 = L_P \cdot i_{P0}^2 / 2$ to $E_{CCMmax} = L_S \cdot i_{SP}^2 / 2 = L_P \cdot i_{PP}^2 / 2$. At the time instant $t_7$ the cycle starts over again, the secondary current $i_S$ is blocked by the rectifier diode $D_2$, and the primary current "jumps" to its initial value $i_{P0}$ and ramps up as in the previous cycle.

For the further considerations it is interesting to calculate the average input power $P_{IN}$, which is $$P_{IN} = (\tfrac{1}{2}) \cdot L_P \cdot i_{PP}^2 \text{ in DCM,}$$

whereas it is $$P_{IN} = (\tfrac{1}{2}) \cdot L_P \cdot i_{PAVG}^2 \text{ in CCM.}$$

Although the theoretic calculations for the input power are quite different from the two equations above, it is important to note that the input power is related to the area under the primary current waveforms. Thus, a value representing the input power may be obtained by integrating the primary current sense signal $V_{CS}$ over one switching period. That is, the integrated value represents the input power.

As mentioned above, the time instant, at which the semiconductor switch $T_1$ is switched off, may be determined by comparing the primary current sense signal $V_{CS}$ (see FIG. 1) with a threshold value $V_{REF}$. That is, the semiconductor switch $T_1$ is switched off when the following inequality holds true: $V_{CS} \geq V_{REF}$ which is equivalent with $i_P \geq V_{REF}/R_{CS}$. Such a strategy for determining the switch-off time instant of the semiconductor switch $T_1$ may lead to the power overshot mentioned further above and the need for compensating delays. According to the exemplary embodiments described herein the switch-off time instant is determined in a different way as illustrated in FIG. 3.

Accordingly, an integrated current sense signal $V_{CSINT}$ is compared with a threshold signal $V_{TH}$, wherein this threshold may be a function of the input voltage $V_{IN}$. FIG. 4 illustrates the threshold signal $V_{TH}$, which is a voltage signal in the present example, as a function of the AC line voltage $V_{AC}$ ($V_{IN} = |V_{AC}|$). The circuit of FIG. 3 illustrates a part of the control circuit 5, which is shown in FIG. 1 and which is configured to signal a switch-off of the semiconductor switch $T_1$. The circuit includes a threshold generator circuit 103 that receives a signal representing the level of the input voltage $V_{IN}$ (or the AC line voltage $V_{AC}$) and that generates a corresponding threshold signal $V_{TH}$ therefrom. The circuit further includes an integrator 101 which receives the current sense signal $V_{CS}$ and which integrates this current sense signal thus providing the integrated signal $V_{CSINT}$ (which may be a voltage signal). A comparator 102 receives the two signals $V_{TH}$ and $V_{CSINT}$ and evaluates the inequality $V_{TH} < V_{CSINT}$. When this inequality holds true, an SR-latch 104 is reset by the comparator output (which is coupled to the reset input of the SR latch 104). As a result the output signal $S_{ON}$ of the SR-latch 104 is reset to a low output level, which indicates the end of the on-time of the semiconductor switch and signals a switch-off of the switch $T_1$. The SR-latch 104 may be re-activated by applying an appropriate set signal, which may be generated, e.g., by a clock generator. When using a fixed switching frequency, the set signal is generated periodically dependent on the switching frequency.

Figure 3:
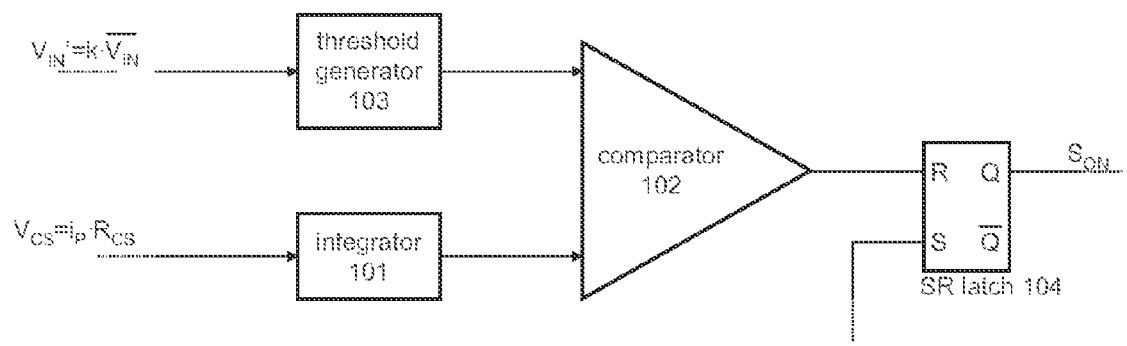
FIG. 3 illustrates the processing of the measured input current in the control circuit of a switching power converter.
Figure 4:
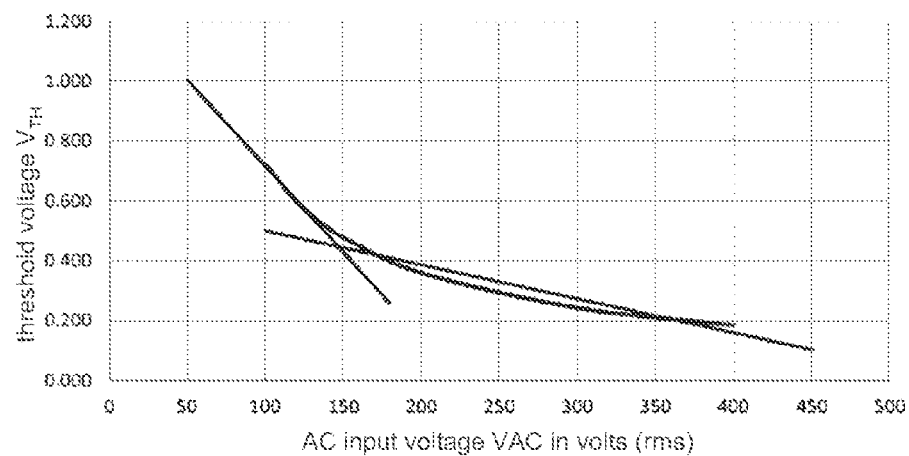
FIG. 4 is a diagram illustrating the relationship between the AC input voltage and the threshold voltage used in the signal processing shown in FIG. 3.

FIG. 4 illustrates an exemplary characteristic curve which is implemented by the threshold generator circuit 103 depicted in FIG. 3. As mentioned above, the input power is related to the input voltage $V_{IN}$ and hence the over-power threshold $V_{TH}$ (with which the integrated current sense signal $V_{CSINT}$ is compared) is derived from the input voltage $V_{IN}$. A typical (idealized) relationship between the over-power threshold $V_{TH}$ and the input voltage $V_{IN}$ is illustrated by the bent line in FIG. 4. An implementation of this characteristic curve (represented by the bent line in FIG. 4) may be difficult. However, the curve may be approximated by at least two straight lines, i.e., by dividing the curve into sections (corresponding to input voltage intervals) and linearizing the curve in each section. The resulting simplified characteristic curve is also illustrated in FIG. 4 and represented by two straight lines. That is, in the present example the characteristic curve is divided into two sections (e.g., input voltages lower or equal than about 145 volts and voltages higher than about 145 volts) wherein in each section the threshold $V_{TH}$ is a linear function (plus an offset) of the input voltage $V_{IN}$.

Figure 5:
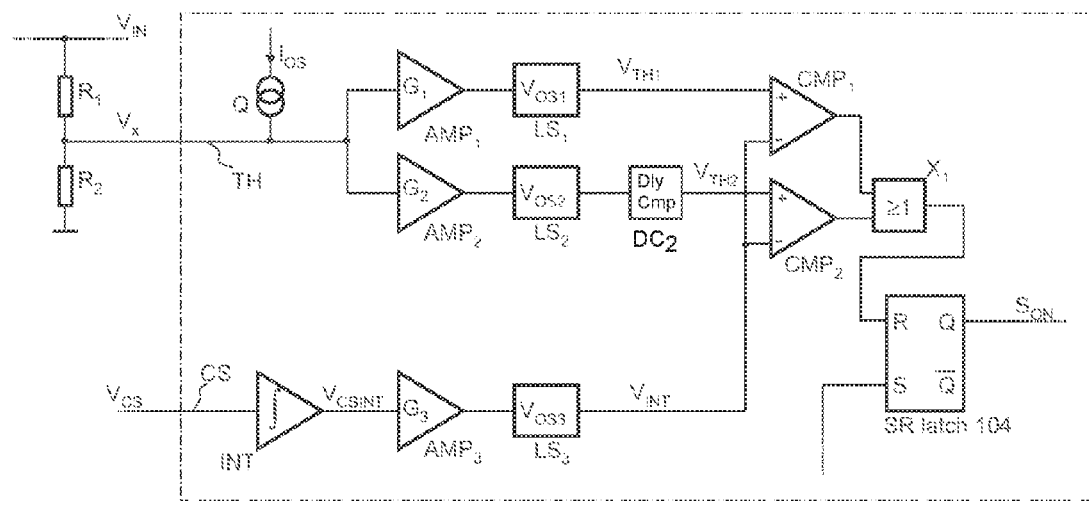
FIG. 5 is an exemplary circuit implementing the signal processing concept illustrated in FIG. 3.

FIG. 5 illustrates one specific example of how to implement the general circuit shown in FIG. 3 for the case that the characteristic curve shown in FIG. 4 is approximated by two straight lines. The present example makes use of a "reversed" characteristic curve $V_{TH'}$ which can be directly obtained from the curve $V_{TH}$ in FIG. 4 using the equation $V_{TH}'=3V-V_{TH}$. The 3V offset has to be regarded as an exemplary value which has been used in the implementation described herein. Such reversion (flipping) of the characteristic curve enables the easy implementation of the circuit of FIG. 3. Accordingly, the control circuit 5 (see FIG. 1), which is supplied with the current sense signal $V_{CS}$, includes an integrator INT which receives the current sense signal $V_{CS}$ and provides the integrated signal $V_{CSINT}$ at its output. The output signal of the integrator INT may be amplified (gain $G_3$), wherein the gain may be negative (e.g., $G_3=-1$) so as to also "flip" the integrated current sense signal $V_{CSINT}$ in the same way as the characteristic curve in FIG. 6 may be obtained from the curve in FIG. 4. The output of the amplifier AMP$_3$ (gain $G_3$) may be shifted by adding an offset value $V_{OS3}$. This operation is accomplished by the level shifter circuit LS$_3$, whose output signal is labeled $V_{INT}$. Together, the amplifier AMP$_3$ and the level shifter LS$_3$ perform the following arithmetic operation:

$$V_{INT}=V_{OS3}+G_3 \cdot V_{CSINT}.$$

In the present example $G_3=-1$ and $V_{OS3}=3V$, the above equation yields $$V_{INT}=3V-V_{CSINT}.$$

$V_{INT}$ represents the integrated current sense value $V_{CSINT}$. That is, the integrated current sense signal is reverted (flipped) in the same way as the characteristic curve representing the threshold shown in FIG. 4.

Figure 6:
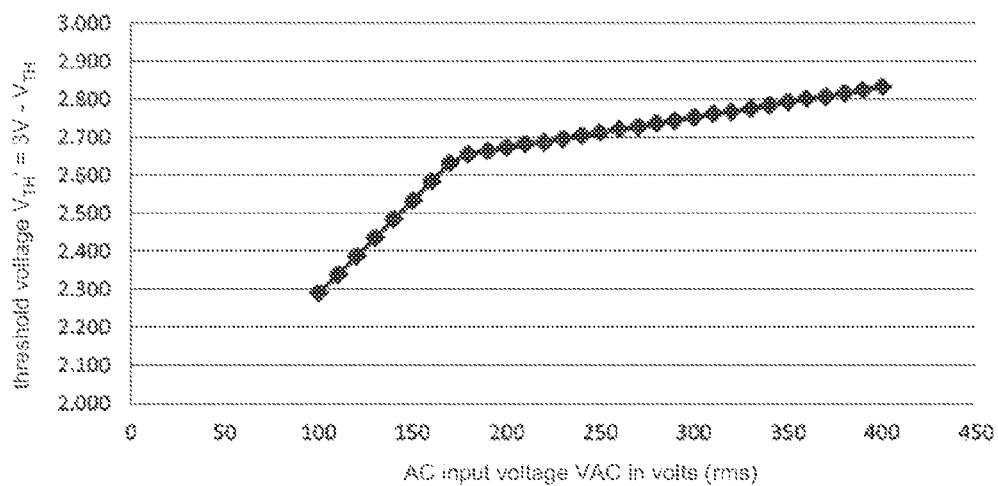
FIG. 6 is a flipped version of the threshold voltage curve of FIG. 4 used in the implementation of FIG. 5.

The amplifiers AMP$_1$ and AMP$_2$ as well as the level shifters LS$_1$ and LS$_2$ and the current source Q are used to generate the threshold signal $V_{TH'}$, e.g., as shown in FIG. 6, which is a "reversed" version of the two-part threshold curve of FIG. 4. As the threshold $V_{TH}$ (see FIG. 4) depends on the input voltage $V_{IN}$, a fraction of the input voltage $V_{IN}$ is supplied to the circuit node TH (which may be a terminal of the control circuit 4) using a resistor voltage divider formed, e.g., by the two resistors $R_1$ and $R_2$. The current source Q is also coupled to the circuit node TH such that the current $i_{OS}$ sourced by the current source Q passes through the voltage divider. As a result, the voltage $V_x$ present at the circuit node TH can be calculated as:

$$V_x=V_{IN} \cdot R_2/(R_1+R_2)+i_{OS} \cdot R_1 R_2/(R_1+R_2).$$

One can see, that the voltage $V_x$ is a fraction of the input voltage $V_{IN}$ plus an offset that is proportional to the current $i_{OS}$. The voltage $V_x$ is received at the inputs of the amplifiers AMP$_1$ and AMP$_2$ having a gain $G_1$ and $G_2$, respectively. The amplifier output signals $G_1 \cdot V_x$ and $G_2 \cdot V_x$ are supplied to the level shifters LS$_1$ and LS$_2$, respectively, and subjected to a level shift. The level shifters LS$_1$ and LS$_2$ provide the offset voltages $V_{OS1}$ and $V_{OS2}$, respectively. That is, the output signals $V_{TH1}$ and $V_{TH2}$ of the level shifters LS$_1$ and LS$_2$, respectively, can be expressed as:

$$V_{TH1}=G_1 \cdot V_x+V_{OS1}, \text{ and}$$

$$V_{TH2}=G_2 \cdot V_x+V_{OS2}.$$

In the present exemplary implementation which has been made for testing the current $i_{OS}$ is 1 microamperes ($i_{OS}=1$ μA), the gain $G_1$ is unity ($G_1=1$), the gain $G_2$ is 0.16 ($G_2=0.16$), the offset voltage $V_{OS1}$ is zero ($V_{OS1}=0V$), and the offset voltage $V_{OS2}$ is 2 volts ($V_{OS2}=2V$).

The output signal $V_{TH2}$ of the level shifter LS$_2$ may be filtered to compensate for the effect of a propagation delay between the time instant, at which a gate signal is applied to the gate of the power MOS transistor $T_1$ so as to switch it off, and the corresponding time instant, at which the actual switch-off of the transistor's load current $i_{CS}$ occurs. As a result of this propagation delay, a current over-shoot may occur between the time instant, the comparator 102 signals a reset of the SR latch 104 (see FIG. 3) and the actual switch-off of the power transistor $T_1$. This over-shot increases as the input voltage $V_{IN}$ increases. That is, the higher the input voltage $V_{IN}$, the higher this over-shot would be. To avoid this adverse effects of the mentioned delay a so called propagation delay compensation circuit DC$_2$ may inserted between the level shifter LS$_2$ and the respective comparator CMP$_2$. A similar circuit may be also provided in the signal path between the level shifter LS$_1$ and the respective comparator CMP$_2$. In the present example, however, delay compensation circuit DC$_2$ is only provided in the signal path to the comparator CMP$_2$ which is effective for thresholds $V_{TH2}$ corresponding to higher input voltage. In essence the delay compensation circuit DC$_2$ includes a small negative offset $V_{OScomp}$ (about −10 mV in the present exemplary implementation) and a low pass filter having a time constant equal or similar to the propagation delay to compensate (about 1 μs in the present exemplary implementation). The mentioned offset $V_{OScomp}$ may be lumped together with the offset $V_{OS2}$ provided by the level shifter LS2 and thus the delay compensation DC$_2$ circuit may be a simple RC low pass circuit LP.

The threshold signals $V_{TH1}$ and $V_{TH2}$ which represent the "reverted" (flipped) threshold curve of FIG. 6 are fed to the non-inverting inputs of the comparators $CMP_1$ and $CMP_2$, respectively. The inverting inputs of both comparators $CMP_1$ and $CMP_2$ receive the "reverted" (flipped) integrated current sense signal $V_{INT}$ discussed above. The outputs of the comparators $CMP_1$ and $CMP_2$ are combined by an OR-gate $X_1$ which provides, at its output, a set signal $S_{SET}$ which is received by the set-input of the SR latch 104 (see FIG. 3). That is, the SR latch 104 is set either when signal $V_{INT}$ falls below the threshold $V_{TH1}$ or below the threshold $V_{TH2}$, wherein both threshold signals depend on the input voltage $V_{IN}$. In such a manner the approximated threshold curve of FIG. 4 is implemented.

Figure 7:
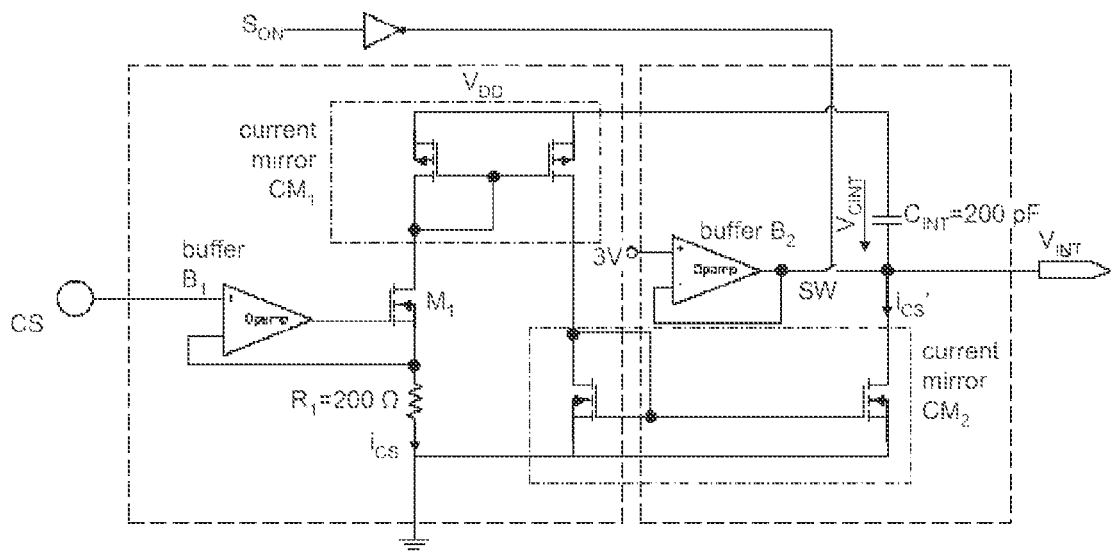
FIG. 7 illustrates the implementation of the integrator used in the example of FIG. 5 in more detail.

FIG. 7 is a circuit diagram illustrating one exemplary implementation of the integrator INT, the amplifier $AMP_3$ and the level shifter $LS_3$. The three components INT, $AMP_3$ and $LS_3$ are implemented together in one circuit. The current sense signal $V_{CS}$, which is applied to the circuit node CS, is received by the buffer amplifier B1, which provides, at its output, such a signal to the gate of the transistor $M_1$ that the load current $i_{CS}$ of the transistor $M_1$ is $i_{CS}=V_{CS}/R_1$. This load current is amplified and "copied" to the current path to which the capacitor $C_{INT}$ is coupled using the current mirrors $CM_1$ and $CM_2$. The corresponding mirror current $i_{CS}'$ charges the capacitor $C_{INT}$ which is coupled between an output current node providing the "flipped," amplified and integrated current sense signal $V_{INT}$ and an internal supply voltage node providing the internal supply voltage $V_{DD}$. The integration is accomplished as the capacitor "integrates" the mirror current $i_{CS}'$. The capacitor voltage $V_{CINT}$ can be calculated as $$V_{CINT} = \int \frac{i_{CS}'}{C_{INT}} dt,$$

wherein $i_{CS}'$ is the current $i_{CS}$ times a gain. The second buffer amplifier $B_2$ provides a constant voltage of $V_{OS3}$ to the output circuit node and "pre-charges" the capacitor to a voltage of $V_{CINT}=V_{DD}-3V$ while the switch SW is closed during the off-time of the power transistor $T_1$ (see FIG. 1). Thus the output voltage $V_{INT}$ (see also FIG. 5) can be calculated as $$V_{INT}(t) = V_{DD} - \left( \int_0^t \frac{A \cdot i_{CS}}{C_{INT}} dx + V_{CINT,0} \right)$$
$$= 3V - \int_0^t \frac{A \cdot V_{CS}}{R_1 C_{INT}} dx,$$

wherein in the equation above $i_{CS}'=A \cdot i_{CS}$ and $i_{CS}=V_{CS}/R_1$. The gain $G_3$ referred to in the description of FIG. 5 is thus $G_3=(A \cdot V_{CS})/(R_1 \cdot C_{INT})$. The time t=0 in the above equation refers to that time instant at which the power transistor $T_1$ (see FIG. 1) closes and the primary current $i_P$ begins to pass through the primary winding $L_P$. It is clear from the present example of FIG. 7 that not all signals occurring in the general example of FIG. 3 necessarily have to be voltage signals. Depending on the implementation (e.g., the output of amplifier $AMP_3$) the signals may also be current signals. Further, the order of the components illustrated in the example of FIG. 5 may be changed (e.g., the integrator INT may be placed downstream of the amplifier $AMP_3$) provided that the function of the overall circuit is maintained.

Using the inventive concept described herein enables a significant reduction of the over-power throughout the total input voltage range. It provides a safety feature by reducing the spread of the maximum input power consumption which depends on the input voltage which may vary within a relatively broad voltage range.

Figure 8:
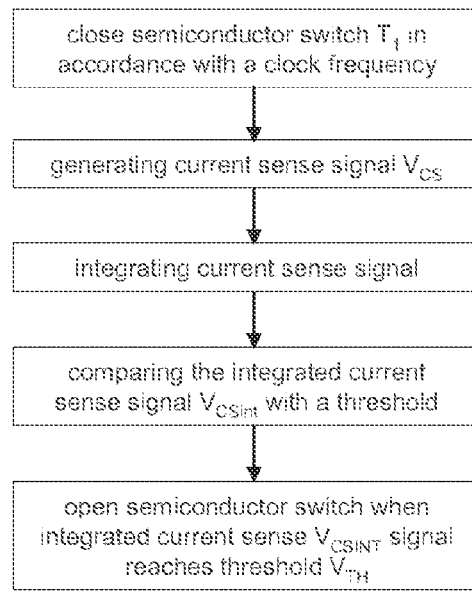
FIG. 8 illustrates an embodiment method.

Some important aspects explained above with respect to the depicted examples are now summarized. It should be noted, however, that the following description is not to be regarded as an exhaustive enumeration of essential feature. Emphasis is rather put on the method of operating the power converters, particularly the power converters as illustrated in or explained with reference to the FIGS. 1 to 7. The flow chart of FIG. 8 is provided to support the following description. The method described herein can be used for operating a power converter, as depicted, for example in FIG. 1, which has an inductor $L_P$ coupled to a terminal operably supplied with the input voltage $V_{IN}$. Accordingly the method comprises generally enabling and disabling an input current $i_P$ passing through the inductor $L_P$ in accordance with a drive signal $V_G$, whereby the semiconductor switch $T_1$ is coupled to the inductor $T_1$ for switching the input current $i_P$ on and off. The method further includes generating a current sense signal $V_{CS}$ that represents the input current $i_P$ passing through the inductor $L_P$ or the semiconductor switch $T_1$. The semiconductor switch $T_1$ is regularly closed in accordance with a pre-defined clock frequency, and the current sense signal $V_{CS}$ is integrated, thus providing an integrated current sense signal $V_{CSINT}$ (see FIG. 3). The method further includes comparing the integrated current sense signal $V_{CSINT}$ with a threshold $V_{TH}$ that is a function of the input voltage $V_{IN}$. The semiconductor switch $T_1$ is opened dependent on the result of the comparison, e.g., when the integrated current sense signal $V_{CSINT}$ has reached the threshold.

As explained above, the threshold may be a function of the input voltage which may be approximated by two or more linear branches (see FIG. 4). In one exemplary implementation a threshold signal is generated dependent on the input voltage $V_{IN}$ for each linear branch used to approximate the function. The integrated current sense signal $V_{CSint}$ may be compared with each threshold signal $V_{TH1}$, $V_{TH2}$ (see FIG. 5). The results of these comparisons are combined, e.g., using an OR-gate as shown in the example of FIG. 5. In order to facilitate the implementation the function defining the threshold as dependent on the input voltage may be "flipped." In this case the integrated current sense signal has to be flipped in the same manner. The flipped integrated current sense signal is then compared with the flipped threshold signal(s).

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A switching power converter that comprising:
   an inductor coupled to a terminal operably supplied with an input voltage;
   a semiconductor switch coupled to the inductor and configured to enable and disable an input current passing through the inductor in accordance with a drive signal;
   a current sense circuit coupled to the inductor or the semiconductor switch and configured to generate a current sense signal representing the input current passing through the inductor or the semiconductor switch;
   a control circuit coupled to receive the current sense signal and configured to:
      close the semiconductor switch regularly in accordance with a clock frequency;
      integrate the current sense signal thus providing an integrated current sense signal;
      compare the integrated current sense signal with a threshold that is a function of the input voltage, wherein the comparison produces an output dependent on the function of the threshold, the function of the threshold effectively having at least two linear portions with respect to the input voltage, each linear portion having an offset and a different constant gradient with respect to the input voltage; and
      open the semiconductor switch dependent on a result of the comparison.

2. The switching power converter of claim 1, wherein the control circuit includes an integrator configured to receive the current sense signal and to provide the integrated current sense signal.

3. The switching power converter of claim 1, wherein the control circuit includes a threshold generator circuit coupled to receive a signal representing the input voltage and is configured to generate the threshold that is a function of the input voltage.

4. The switching power converter of claim 3, further comprising a comparator coupled to receive the integrated current sense signal and the threshold, the comparator being configured to signal when the integrated current sense signal reaches the threshold,
   wherein the semiconductor switch is opened when the comparator signals that the integrated current sense signal has reached the threshold.

5. The switching power converter of claim 1, wherein control circuit is configured to compare the integrated current sense signal with two thresholds.

6. The switching power converter of claim 1, wherein control circuit is configured to compare the integrated current sense signal with a threshold that is a function of the input voltage by comparing the integrated current sense signal with a first threshold associated with a first of the at least two linear portions to form a first comparison output, comparing the integrated current sense signal with a second threshold associated with a second of the at least two linear portions to form a second comparison output, and evaluating a logical function of the first comparison output and the second comparison output to produce the output of the comparator.

7. A switching power converter comprising:
   an inductor coupled to a terminal operably supplied with an input voltage;
   a semiconductor switch coupled to the inductor and configured to enable and disable an input current passing through the inductor in accordance with a drive signal;
   a current sense circuit coupled to the inductor or the semiconductor switch and configured to generate a current sense signal representing the input current passing through the inductor or the semiconductor switch;
   a control circuit coupled to receive the current sense signal and a signal representing the input voltage, wherein the control circuit further comprises:
      a threshold generator coupled to receive the signal representing the input voltage and configured to generate a threshold, which is a function of the input voltage;
      an integrator coupled to receive the current sense signal as an input current and configured to generate a signal representing an integrated input current;
      a comparator coupled to receive the threshold and the signal representing the integrated input current and configured to indicate when the signal representing the integrated input current reaches the threshold, wherein the comparator produces an output dependent on the function of the threshold, the function of the threshold effectively having at least two linear portions with respect to the input voltage, each linear portion having an offset and a different constant gradient with respect to the input voltage; and
      a driver circuit configured to switch on the semiconductor switch periodically in accordance with a clock signal and to switch off the semiconductor switch when the comparator indicates that the signal representing the integrated input current has reached the threshold.

8. The switching power converter of claim 7, wherein the driver circuit includes an SR-latch, which is configured to be:
   periodically set in response to the clock signal;
   coupled to the comparator; and
   reset when the comparator indicates that the signal representing the integrated input current has reached the threshold;
   wherein the semiconductor switch is coupled to an output of the SR-latch and switched on and off in accordance with the output of the SR-latch.

9. The switching power converter of claim 7, wherein the signal representing the input voltage received by the control circuit is a fraction of the input voltage tapped at a middle tap of a resistor voltage divider.

10. The switching power converter of claim 9, wherein the control circuit further includes a current source coupled to the middle tap of the voltage divider thus effecting an offset voltage superposed to the fraction of the input voltage.

11. The switching power converter of claim 7, wherein the threshold generator includes a first series circuit comprising a first amplifier and a first level shifter, and a second series circuit comprising a second amplifier and a second level shifter, for providing a first and a second threshold value.

12. The switching power converter of claim 11, wherein the comparator is configured to use, as threshold, the first or the second threshold value.

13. The switching power converter of claim 12, wherein the comparator includes a first comparator circuit configured to compare the signal representing the integrated input current with the first threshold value and a second comparator circuit configured to compare the signal representing the integrated input current with the second threshold value.

14. The switching power converter of claim 13, wherein the comparator further includes an or-gate coupled to combine outputs of the first and the second comparator circuits.

15. The switching power converter of claim 7, wherein the comparator comprises:
a first comparator configured to compare the signal representing the integrated input current with a first threshold; and
a second comparator configured to compare the signal representing the integrated input current with a second threshold.

16. The switching power converter of claim 7, wherein the comparator comprises:
a first comparator configured to compare the signal representing the integrated input current with a first threshold associated with a first of the at least two linear portions to form a first comparison output;
a second comparator configured to compare the signal representing the integrated input current with a second threshold associated with a second of the at least two linear portions to form a second comparison output; and
a logic circuit configured to evaluate a logical function of the first comparison output and the second comparison output to form the output of the comparator.

17. A method for operating a power converter, which comprises an inductor coupled to an terminal operably supplied with an input voltage, the method comprising:
enabling and disabling an input current passing through the inductor in accordance with a drive signal by using a semiconductor switch coupled to the inductor;
generating a current sense signal representing the input current passing through the inductor or the semiconductor switch;
closing the semiconductor switch regularly in accordance with a clock frequency;
integrating the current sense signal thus providing an integrated current sense signal;
comparing the integrated current sense signal with a threshold that is a function of the input voltage; and
opening the semiconductor switch dependent on a result of the comparing, wherein the threshold is a function of the input voltage, wherein the comparing produces an output dependent on the function of the threshold, the function of the threshold effectively having at least two linear portions with respect to the input voltage, each linear portion having an offset and a different constant gradient with respect to the input voltage.

18. The method of claim 17, wherein comparing the integrated current sense signal comprises detecting when the integrated current sense signal reaches the threshold, and wherein opening the semiconductor switch comprises opening the semiconductor switch in response to the integrated current sense signal reaching the threshold.

19. The method of claim 17, further comprising generating a threshold signal, whose actual value is used as threshold, the threshold signal being a function of the input voltage.

20. The method of claim 19, wherein the threshold signal is low-pass filtered before comparing the integrated current sense signal with the threshold.

21. The method of claim 19, wherein generating a threshold comprises generating a first and a second threshold signal.

22. The method of claim 21, wherein generating the first and second threshold signals comprises:
receiving a fraction of the input voltage;
applying an offset to the input voltage thus providing a first signal;
amplifying the first signal with a first and a second gain, respectively; and
level-shifting the first signal with a first and a second offset, respectively;
wherein the first threshold signal comprises the first signal amplified by a first gain and level-shifted by a first offset; and
wherein the second threshold signal comprises the first signal amplified by a second gain and level-shifted by a second offset.

23. The method of claim 22, wherein comparing the integrated current sense signal comprises:
comparing the integrated current sense signal with the first threshold signal using a first comparator;
comparing the integrated current sense signal with the second threshold signal using a second comparator; and
combining outputs of the first and the second comparators.

24. The method of claim 17, wherein the comparing the integrated current sense signal comprises comparing the integrated current sense signal with two thresholds.

25. The method of claim 17, wherein the comparing the integrated current sense signal comprises comparing the integrated current sense signal with a first threshold associated with a first of the at least two linear portions to form a first comparison output, comparing the integrated current sense signal with a second threshold associated with a second of the at least two linear portions to form a second comparison output, and evaluating a logical function of the first comparison output and the second comparison output.

* * * * *